(12) United States Patent
Lee

(10) Patent No.: US 8,862,840 B2
(45) Date of Patent: Oct. 14, 2014

(54) DISTRIBUTED STORAGE SYSTEM, APPARATUS, AND METHOD FOR MANAGING DISTRIBUTED STORAGE IN CONSIDERATION OF REQUEST PATTERN

(75) Inventor: Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 210 days.

(21) Appl. No.: 13/619,634

(22) Filed: Sep. 14, 2012

(65) Prior Publication Data
US 2013/0111114 A1    May 2, 2013

(30) Foreign Application Priority Data
Nov. 2, 2011    (KR) .................. 10-2011-0113533

(51) Int. Cl.
| | | |
|---|---|---|
| G06F 12/08 | (2006.01) | |
| G06F 21/00 | (2013.01) | |
| G06F 12/16 | (2006.01) | |
| G06F 11/20 | (2006.01) | |
| G06F 11/34 | (2006.01) | |

(52) U.S. Cl.
CPC ............ *G06F 12/16* (2013.01); *G06F 11/2094* (2013.01); *G06F 21/00* (2013.01); *G06F 11/3433* (2013.01); *G06F 11/3485* (2013.01)
USPC .................. 711/158; 711/103; 711/E12.008; 711/E12.084

(58) Field of Classification Search
USPC .................. 711/103, 158, E12.008, E12.084
See application file for complete search history.

(56) References Cited

U.S. PATENT DOCUMENTS

| | | | |
|---|---|---|---|
| 2005/0262317 A1* | 11/2005 | Nakanishi et al. ............ 711/162 |
| 2006/0069886 A1* | 3/2006 | Tulyani ........................ 711/161 |
| 2006/0143419 A1* | 6/2006 | Tulyani ........................ 711/165 |
| 2008/0010398 A1* | 1/2008 | Jiang ............................ 711/103 |
| 2009/0037648 A1 | 2/2009 | Park et al. |
| 2010/0017564 A1 | 1/2010 | Heo et al. |
| 2010/0180070 A1 | 7/2010 | Kim et al. |
| 2010/0257219 A1* | 10/2010 | Patel et al. ..................... 707/827 |
| 2012/0198152 A1* | 8/2012 | Terry et al. .................... 711/114 |

FOREIGN PATENT DOCUMENTS

| | | |
|---|---|---|
| KR | 10-2009-0012821 A | 2/2009 |
| KR | 10-2010-0008485 A | 1/2010 |
| KR | 10-2010-0033101 A | 3/2010 |
| KR | 10-2010-0083411 A | 7/2010 |

* cited by examiner

*Primary Examiner* — Hal Schnee
(74) *Attorney, Agent, or Firm* — Volentine & Whitt, PLLC

(57) ABSTRACT

A distributed storage management apparatus includes a monitoring unit configured to monitor a request pattern of each storage node of a plurality of storage nodes configured to distributively store data and at least one replica of the data; a group setting unit configured to receive a request and classify the plurality of storage nodes into a safe group and an unsafe group based on the monitored request pattern of each storage node; and a request transfer unit configured to transfer the received request to the safe group.

19 Claims, 5 Drawing Sheets

DISTRIBUTED STORAGE SYSTEM, APPARATUS, AND METHOD FOR MANAGING DISTRIBUTED STORAGE IN CONSIDERATION OF REQUEST PATTERN

CROSS-REFERENCE TO RELATED APPLICATIONS

This application claims the benefit under 35 USC 119(a) of Korean Patent Application No. 10-2011-0113533, 10-2011-0113533 filed on Nov. 2, 2011, the entire disclosure of which is incorporated herein by reference for all purposes.

BACKGROUND

1. Field

The following description relates to a distributed storage technique a for fast read/write operation.

2. Description of the Related Art

In general, a distributed storage system includes a plurality of storage nodes and provides storage areas to a plurality of clients that are connected to the plurality of storage nodes through a network.

When a client stores data in the distributed storage system, the distributed storage system stores the original data and a predetermined number of replicas of the original data distributively in a plurality of storage nodes. This enables the distributed storage system to prevent data loss when failure occurs in one or more of the storage nodes since data stored in the faulty storage node(s) is also stored other storage nodes that are not faulty.

When a read/write request is transferred to a storage included in each storage node, latency may occur due to the characteristics of the storage. For example, if a storage included in a storage node is a Hard Disk Drive (HDD), latency may occur due to the mechanical characteristics of the HDD that rotates at a constant or variable speed to perform a read/write operation.

SUMMARY

According to an aspect, a distributed storage management apparatus includes a monitoring unit configured to monitor a request pattern of each storage node of a plurality of storage nodes configured to distributively store data and at least one replica of the data; a group setting unit configured to receive a request and classify the plurality of storage nodes into a safe group and an unsafe group based on the monitored request pattern of each storage node; and a request transfer unit configured to transfer the received request to the safe group.

Each storage node may include a solid-state drive (SSD)-based storage unit.

The monitoring unit may be further configured to create reception information about requests each storage node has received over a period of time according to types of the requests as the request pattern of each storage node.

The types of the requests may include a random access request and a sequential access request.

The reception information may include a size of data that has been stored in each storage node according to the types of requests and/or a number of times the types of requests have been received.

The group setting unit may include a model storage unit configured to store a predetermined malignant pattern defined for each storage node.

The malignant pattern may be any pattern or any combination of patterns selected from a pattern in which random write requests are repeated more than a threshold time and/or more than a threshold number of times; a pattern in which sequential write requests are repeated more than a threshold time and/or more than a threshold number of times; and a pattern in which a random read request includes an idle period that is shorter than a threshold time.

The group setting unit may further include a first setting unit configured to receive the request; create an estimated pattern for each storage node by changing the monitored request pattern of the storage node to a changed request pattern that assumes the received request has been transferred to the storage node; compare the estimated pattern with the malignant pattern for each storage node; and classify the plurality of storage nodes into the safe group and the unsafe group according to a result of the comparing.

The first setting unit may be further configured to classify each storage node for which the estimated pattern is substantially identical to the malignant pattern into the unsafe group; and classify each storage node for which the estimated pattern is not substantially identical to the malignant pattern into the safe group.

The group setting unit may further include a second setting unit configured to compare the request pattern to the malignant pattern for each storage node at regular time intervals; and classify the plurality of storage nodes into the safe group and the unsafe group according to a result of the comparing.

The request transfer unit may be further configured to select at least two storage nodes from a plurality of storage nodes belonging to the safe group; and transfer the received request to the selected storage nodes.

According to an aspect, distributed storage system includes a distributed storage including a plurality of storage nodes based on a solid-state drive (SSD) configured to distributively store data and at least one replica of the data; a monitoring unit configured to monitor a request pattern of each storage node; a group setting unit configured to receive a request and classify the plurality of storage nodes into a safe group and an unsafe group based on the monitored request pattern of each storage node; and a request transfer unit configured to transfer the received request to the safe group.

According to an aspect, a distributed storage management method includes monitoring a request pattern of each storage node of a plurality of storage nodes configured to distributively store data and at least one replica of the data; receiving a request and classifying the plurality of storage nodes into a safe group and an unsafe group based on the monitored request pattern of each storage node; and transferring the received request to the safe group.

According to an aspect, a distributed storage management apparatus for managing access to a plurality of storage units configured to distributively store original data and at least one replica of the original data includes a monitoring unit configured to create a request pattern for each storage node of the plurality of storage nodes based on access requests that have been transferred to each storage node in the past; a group setting unit configured to receive a new access request and classify the plurality of storage units into a safe group and an unsafe group based on the new access request and the request pattern for each storage node; and a request transfer unit configured to transfer the new access request to the safe group.

The monitoring unit may be further configured to create the request pattern for each storage node for a plurality of time intervals in the past.

The request pattern may include information about each of a plurality of types of access requests that have been transferred to each storage node in the past.

The group setting unit may include a setting unit configured to receive the new access request; create an estimated pattern for each storage node by changing the request pattern for the storage node to reflect an effect of the new access request being transferred to the storage node; compare the estimated pattern for each storage node with a malignant pattern for the storage node, the malignant pattern being a request pattern that degrades a performance of the storage node; and classify the plurality of storage nodes into the safe group and the unsafe group based on a result of the comparing.

The group setting unit may further include a model storage unit configured to store the malignant pattern for each storage node.

The group setting unit may further include a setting unit configured to compare the request pattern for each storage node with a malignant pattern for the storage node, the malignant pattern being a request pattern that degrades a performance of the storage node; and classify the plurality of storage nodes into the safe group and the unsafe group based on a result of the comparing.

The request transfer unit may be further configured to select a plurality of storage nodes from the safe group; and transfer the new access request to the selected storage nodes.

The plurality of storage units may be further configured to distributively store the original data and N replicas of the original data, N being an integer greater than or equal to 1; and the request transfer unit may be further configured to select N+1 storage nodes from the safe group; and transfer the new access request to the selected N+1 storage nodes.

Other features and aspects will be apparent from the following detailed description, the drawings, and the claims.

DETAILED DESCRIPTION

Figure 1:
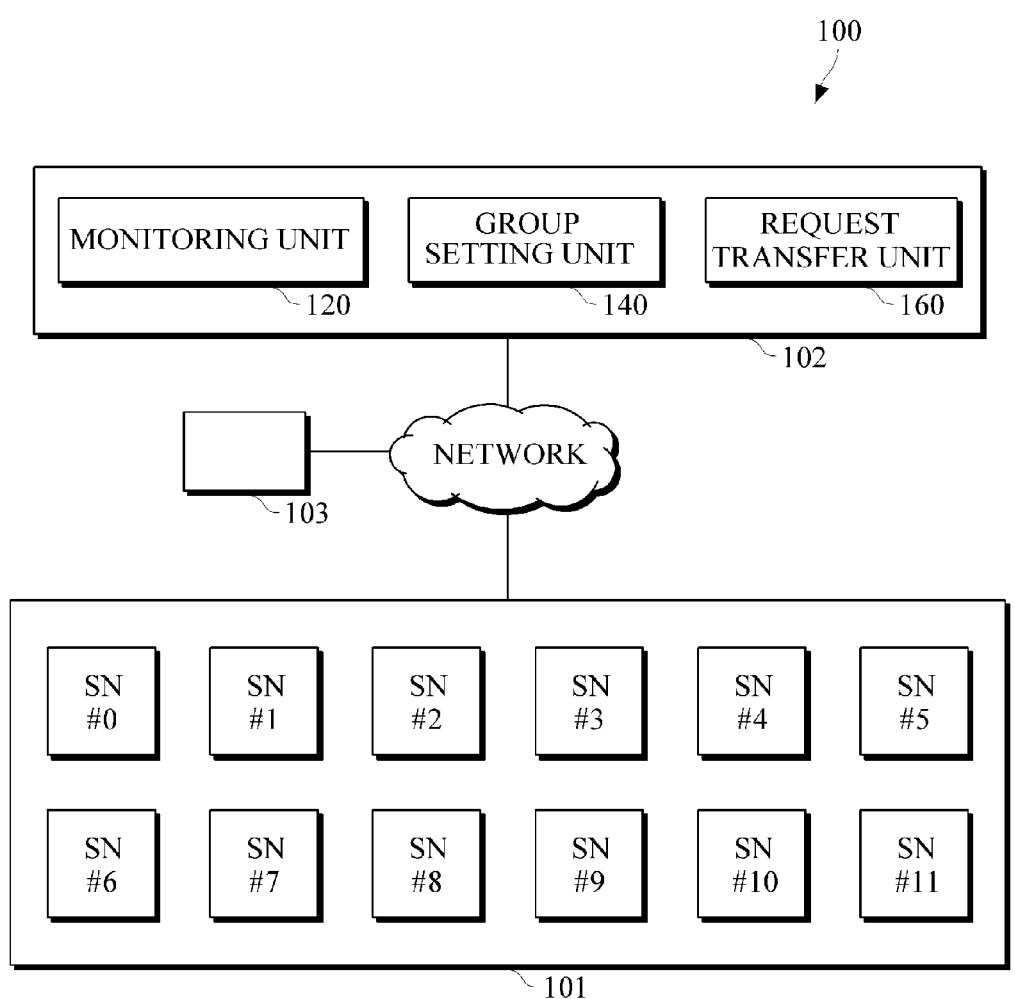
FIG. 1 is a diagram illustrating examples of a distributed storage system and a distributed storage management apparatus.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The relative size and depiction of these elements may be exaggerated for clarity, illustration, and convenience.

FIG. 1 is a diagram illustrating examples of a distributed storage system 100 and a distributed storage management apparatus 102. Referring to FIG. 1, the distributed storage system 100 includes a distributed storage 101, the distributed storage management apparatus 102, and a client 103 that are connected to each other through a network.

The distributed storage 101 includes a plurality of nodes SN#0 through SN#11. For convenience of description, FIG. 1 shows 12 storage nodes, but the number of storage nodes is not limited to 12, and there may be fewer than 12 storage nodes or more than 12 storage nodes. The distributed storage 101 stores data distributively in the respective storage nodes SN#0 through SN#11 using a plurality of replicas. That is, when the distributed storage 101 receives certain data to be stored, it creates a predetermined number of replicas of the data. For example, if the distributed storage 101 distributively stores data in three storage nodes, the distributed storage 101 creates two replicas of received data. That is, the distributed storage 101 stores the original data and two replicas of the original data in the respective ones of the three storage nodes. Accordingly, several storage nodes in the distributed storage 101 will store the same data therein.

Each storage node of the distributed storage 101 may include a CPU, a memory, a storage unit, a network interface, etc. For example, each storage node may be a computer device that can process certain operations, tasks, or instructions independently. Also, the storage nodes SN#0 through SN#11 may be connected to each other for intercommunication through an external network. The external network may be the Internet.

The storage unit included in each storage node may be a hard disk drive (HDD), NAND flash, a solid-state drive (SSD), or any other type of memory that is known to one of ordinary skill in the art. However, since the HDD has a mechanical device that performs a read/write operation on a disk rotating at a constant or variable speed, in some applications, the NAND flash or SSD may be preferable.

Unlike the HDD, the SSD (or NAND flash) has no mechanical components, and accordingly has relatively short latency with the ability to perform a random read/write operation. However, the performance of an SSD based on NAND flash tends to be dependent on a past read/write request pattern. According to an aspect, the distributed storage system 100 excludes a storage node(s) having a request pattern that causes performance degradation from a read/write operation. This will be described in greater detail later.

The distributed storage management apparatus 102 receives a data request from the client 103 and processes the received data request. The data request may be a data write request or a data read request. According to an aspect, the distributed storage system 100 a key-value interface to read and write data. For example, when the client 103 desires to write data in the distributed storage 101, the client 103 transmits a data write request in the form of {key, value} to the distributed storage management apparatus 102, wherein "key" represents an address or identification information of a storage node, and "value" represents data to be stored in the distributed storage 101. The distributed storage management apparatus 102 that has received the data write request creates a predetermined number of replicas of the original data in the data write request, and then stores the original data and the replicas distributively in respective ones of the storage nodes of the distributed storage 101. Also, when the client 103 desires to read the data from the distributed storage 101, the client 103 transmits a data read request in the form of {key} to the distributed storage management apparatus 102. The distributed storage management apparatus 102 that has received the data read request select one piece of data from data distributively stored in the plurality of storage nodes with reference to the key value, and transmits the selected data to the client 103.

The distributed storage management apparatus 102 includes a monitoring unit 120, a group setting unit 140, and a request transfer unit 160.

The monitoring unit 120 monitors a request pattern of each storage node. A request pattern is reception information of each storage node with respect to a data read/write request. In other words, the request pattern is information about what types of data read/write requests (hereinafter simply referred to as "requests") each storage node has received from a specific time point in the past to a current time point.

Figure 2:
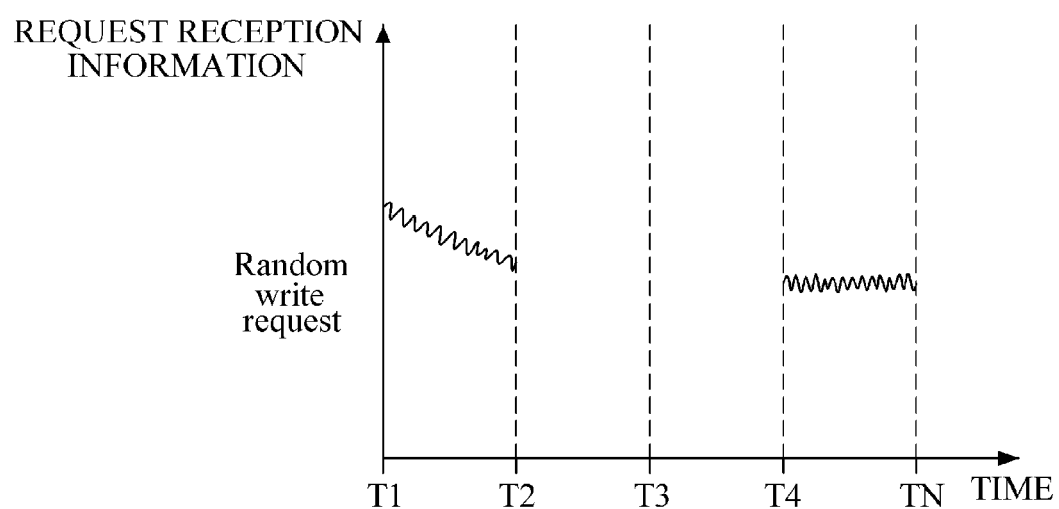
FIG. 2 illustrates an example of a request pattern of a storage node.
Figure 2:
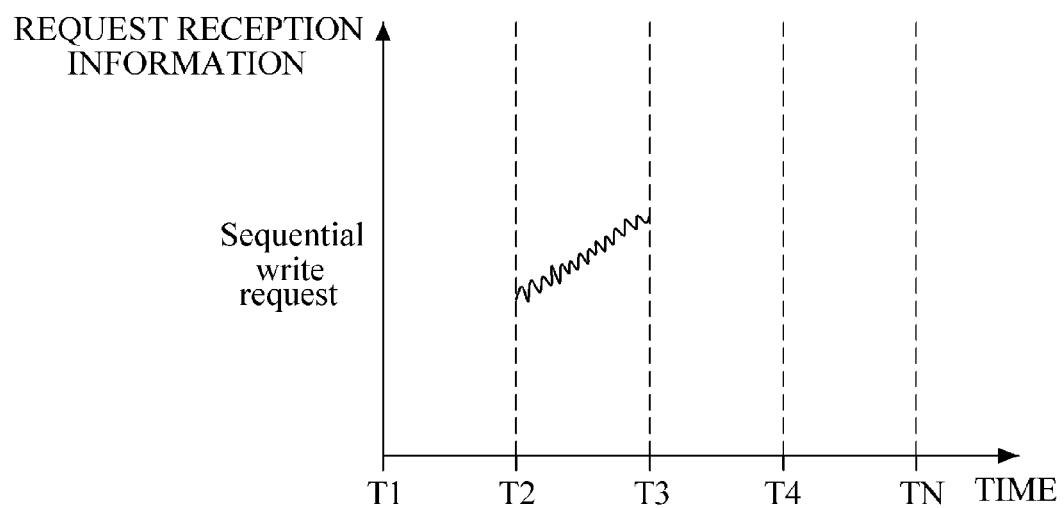

FIG. 2 illustrates an example of a request pattern of a storage node. Referring to FIG. 2, the request pattern is a request pattern of a specific storage node (for example, SN#0 of FIG. 1).

According to an aspect, the request pattern is information about what types of requests a storage node (for example, SN#0) has received over time. The types of requests include a random write request and a sequential write request. The information may include the size of data that was stored in the storage node SN#0 according to the request and/or a number of times the corresponding request was received. However, the information may include other information about the requests.

For example, in FIG. 2, the x-axis of each graph may represents time and the y-axis represents the number of times the requests were received. Referring to FIG. 2, the number of times that random write requests were received gradually decreases from a time point T1 to a time point T2, the number of times that sequential write requests were received gradually increases from the time point T2 to a time point T3, no requests were received from the time point T3 to a time point T4, and random write requests were received at regular intervals from the time point T4 to a current time point TN.

Thus, a request pattern may be defined as state or tendency information of requests that a storage node has received from a specific time point in the past to a current time point according to the types of the requests.

In FIG. 2, for convenience of description, it is assumed that the y-axis of each graph represents the number of times that requests have been received, but the y-axis may represent the size of data accompanied by a write request.

Referring again to FIG. 1, the monitoring unit 120 periodically creates, stores, and updates a request reception state of each storage node according to the type of each request as a request pattern. For example, the monitoring unit 120 manages, as illustrated in FIG. 2, the number of requests transferred to each storage node during a plurality of time intervals according to the types of the requests.

The group setting unit 140 classifies the storage nodes into a safe group and an unsafe group based on a monitored request pattern. Each storage node may have a unique request pattern causing performance degradation according to the characteristics (for example, the characteristics of an SSD) of the storage node. In this example, the unique request pattern causing performance degradation is defined as a malignant pattern. The safe group is defined as a group of storage nodes whose monitored request patterns have a relatively small degree of similarity with the malignant pattern, i.e., a degree of similarity that is smaller than a predetermined threshold value, and the unsafe group is defined as a group of storage nodes whose monitored request patterns have a relatively great degree of similarity with the malignant pattern, i.e., a degree of similarity that is equal to or greater than the predetermined threshold value.

The request transfer unit 160 transfers a request received from the client 103 to storage nodes belonging to the safe group. For example, the request transfer unit 160 selects N storage nodes from among a plurality of storage nodes belonging to the safe group, and transfers a received request to the selected storage nodes, where N may be equal to K+1 (where K is the number of replicas that are to be created), or may be the number of locations at which data is to be distributively stored.

For example, if the storage node SN#0 is set to belong to the unsafe group by the group setting unit 140, the request transfer unit 160, when storing original data and its replicas in response to a write request from the client 103, stores the original data and the replicas in storage nodes excluding the storage node SN#0. Thereafter, if the request pattern of the storage node SN#0 changes to have a relatively small degree of similarity with the malignant pattern because no request has been transferred to the storage node SN#0 for a predetermined time period, the group setting unit 140 may transfer the storage node SN#0 to the safe group.

Figure 3:
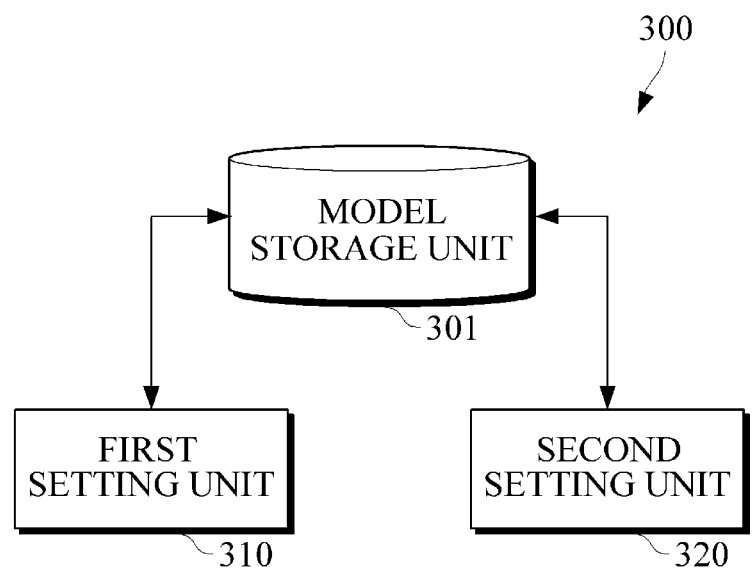
FIG. 3 is a diagram illustrating an example of a group setting unit.

FIG. 3 is a diagram illustrating an example of a group setting unit 300. Referring to FIG. 3, the group setting unit 300 includes a model storage unit 301, a first setting unit 310, and a second setting unit 320. However, the configuration of FIG. 3 is only an example, and the group setting unit 300 may include the first setting unit 310 but not the second setting unit 320, or may include the second setting unit 320 but not the first setting unit 310, or the first setting unit 310 and the second setting unit 320 may be combined into a single setting unit that performs the functions of the first setting unit 310 and the functions of the second setting unit 320.

The model storage unit 301 stores malignant patterns defined for a plurality of storage nodes, and may be an HDD, NAND flash, an SSD, or any other type of memory that is known to one of ordinary skill in the art. The malignant patterns are unique request patterns that cause performance degradation. The malignant patterns depend on the characteristics of the individual storage nodes. Accordingly, if all of the storage nodes have the same configuration, the storage nodes may have the same malignant pattern. The malignant pattern may be a pattern in which random write requests are repeated more than a threshold time and/or more than a threshold number of times, a pattern in which sequential write requests are repeated more than a threshold time and/or more than a threshold number of times, a pattern in which a random read request includes an idle period that is shorter than a threshold time, or any combination of such patterns.

When the first setting unit 310 receives a request from a client (for example, the client 103 in FIG. 1), the first setting unit 310 creates an estimated pattern. The estimated pattern is a changed request pattern of a storage node when it is assumed that the received request has been transferred to the storage node.

Then, the first setting unit 310 compares the estimated pattern with a malignant pattern defined for the storage node that is stored in the model storage unit 301, and sets the storage node to a safe group or an unsafe group according to a result of the comparison. For example, the first setting unit 310 calculates a predetermined value (hereinafter referred to as a "degree of similarity") that represents a similarity between the estimated pattern and the malignant pattern. If the degree of similarity is equal to or greater than a predetermined threshold value, the first setting unit 310 determines that the estimated pattern is substantially identical to the malignant pattern, and sets the storage node to the unsafe group. Conversely, if the degree of similarity is smaller than the predetermined threshold value, the first setting unit 310 determines that the estimated pattern is not identical to the malignant pattern, and sets the storage node to the safe group.

In other words, the first setting unit 310 classifies a storage node into the unsafe group if there is possibility that a received request will change the request pattern of the storage node to a malignant pattern causing performance degradation, and classifies the storage node into the safe group if there is little possibility that the received request will change the request pattern of the storage node to the malignant pattern.

The second setting unit 320 compares a request pattern to a malignant pattern at regular time intervals regardless of a request from the client 103, and redefines a safe group and an unsafe group if necessary based on the result of the comparison. For example, after the request transfer unit 160 has transferred a request based on the safe group and the unsafe group set by the first setting unit 310, the second setting unit 320 calculates a degree of similarity between an estimated pattern and a malignant pattern of each storage node, and updates a group setting if necessary according to the degree of similarity. This might result in the second setting unit 320 transferring one or more storage nodes belonging to the safe group to the unsafe group, and/or transferring one or more storage nodes belonging to the unsafe group to the safe group.

Figure 4:
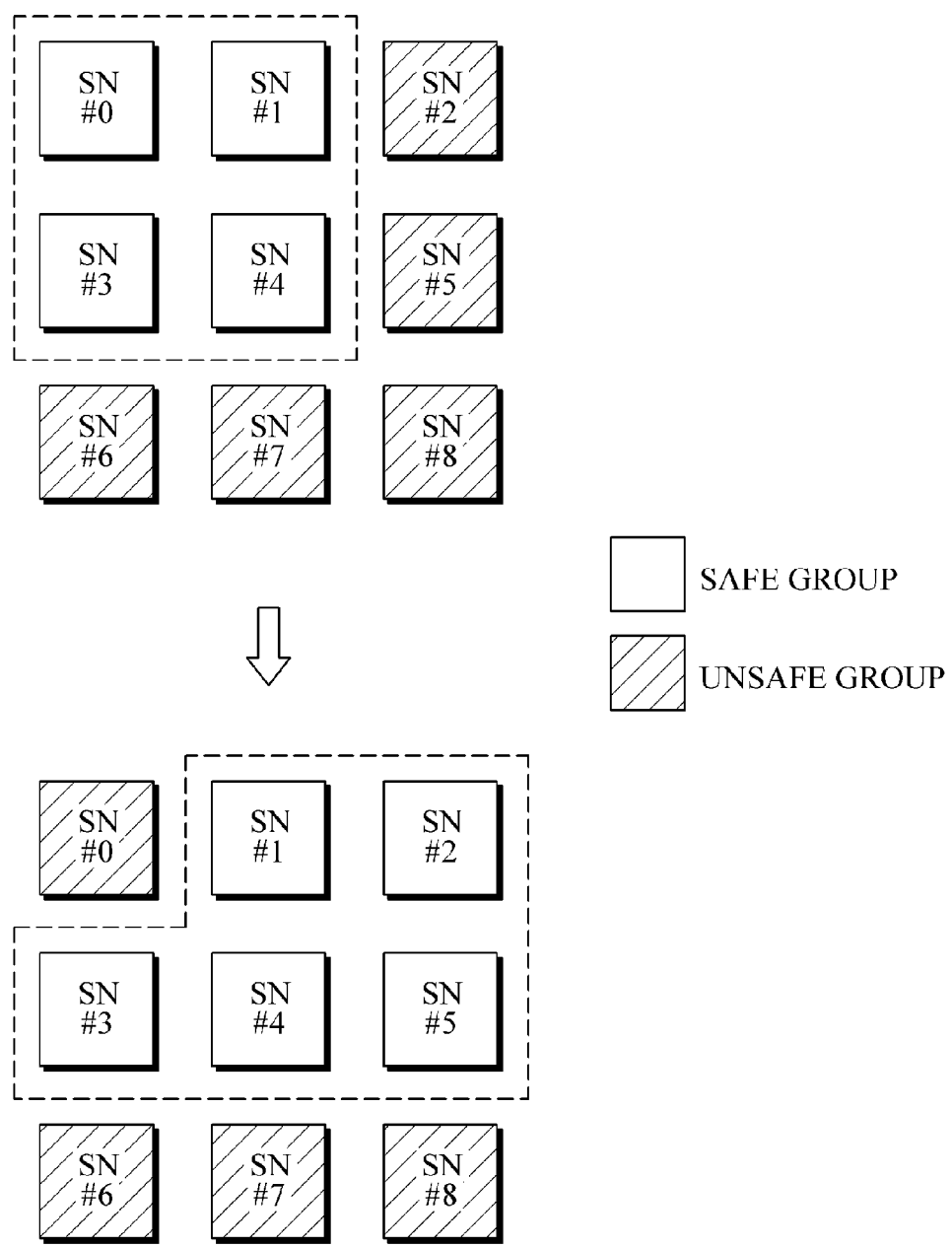
FIG. 4 is a view for explaining an example of a group setting method and an example of a request transfer method.

FIG. 4 is a view for explaining an example of a group setting method and an example of a request transfer method. Referring to FIGS. 1 and 4, when the distributed storage management apparatus 102 receives a request, the group setting unit 140 classifies each storage node into the safe group or the unsafe group based on a request pattern of each storage node detected by the monitoring unit 120. For example, the group setting unit 140 creates an estimated pattern, which is a changed request pattern of a storage node assuming that the received request has been transferred to the storage node, for each storage node, and based on the estimated pattern, sets the storage nodes SN#0, SN#1, SN#3, and SN#4 to the safe group, and sets the storage nodes SN#2, SN#5, SN#6, SN#7, and SN#8 to the unsafe group. After the group setting unit 140 has completed the group setting, the request transfer unit 160 transfers the request to storage nodes in the safe group. For example, if three pieces of data, such as original data and two replicas of the original data, are to be distributively stored in three storage nodes, the request transfer unit 160 selects three storage nodes from the storage nodes SN#0, SN#1, SN#3, and SN#4 in the safe group, and transfers the three pieces of data to the selected three storage nodes.

Also, according to another aspect, the request transfer unit 160 may select the three storage nodes from the storage nodes SN#0, SN#1, SN#3, and SN#4 in the safe group in an order of an increasing degree of similarity between their estimated patterns and their malignant patterns. That is, the request transfer unit 160 may select one of the storage nodes SN#0, SN#1, SN#3, and SN#4 having a lowest degree of similarity between its estimated pattern and its malignant pattern as a first selected storage node; then select one of the storage nodes SN#0, SN#1, SN#3, and SN#4 having a second lowest degree of similarity between its estimated pattern and its malignant pattern as a second selected storage node; and then select one of the storage nodes SN#0, SN#1, SN#3, and SN#4 having a third lowest degree of similarity between its estimated pattern and its malignant pattern as a third selected storage node. Alternatively, the request transfer unit 160 may select three storage nodes have the three lowest degrees of similarity between their estimated patterns and their malignant patterns from the storage nodes SN#0, SN#1, SN#3, and SN#4 either simultaneously or one at a time in any order.

After the request transfer unit 160 has transferred the request to the selected storage nodes in the safe group, the monitoring unit 120 updates a request pattern of each storage node according to the request, and the group setting unit 140 redefines the safe group and the unsafe group if necessary based on the updated request pattern of each storage node. For example, when a predetermined time has elapsed after a request has been transferred and a read/write operation has been executed, the group setting unit 140 may transfer the storage node SN#0 to the unsafe group and transfer the storage nodes SN#2 and SN#5 to the safe group based on degrees of similarity between their request patterns and their malignant patterns.

According to another aspect, when the distributed storage management apparatus 102 receives another request after the group setting unit 140 has updated the group setting, the group setting unit 140 compares a number N of locations at which data is to be stored to a number M of storage nodes currently belonging to the safe group. If N is greater than M, which means that there are not enough storage nodes in the safe group to store all of the data that is to be stored, the group setting unit 140 calculates estimation patterns for the storage nodes currently belonging to the safe group and the unsafe group, and then redefines the safe group and the unsafe group as necessary based on the result of the calculation.

Figure 5:
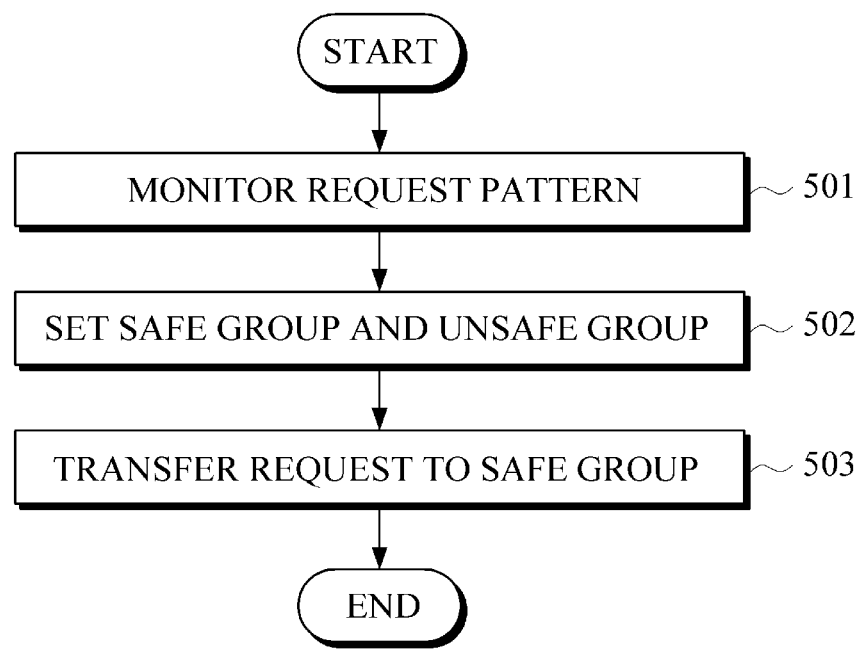
FIG. 5 is a flowchart illustrating an example of a distributed storage management method.

FIG. 5 is a flowchart illustrating an example of a distributed storage management method. The distributed storage management method will be described with reference to FIGS. 1 and 5 below.

The distributed storage management apparatus 102 monitors a request pattern of each storage node of the distributed storage 101 in 501. For example, the monitoring unit 120 collects and stores a request pattern as illustrated in FIG. 2 for each storage node.

When the distributed storage management apparatus 102 receives a data read/write request, the distributed storage management apparatus 102 classifies storage nodes into a safe group and an unsafe group based on request patterns of the storage nodes in 502. For example, the group setting unit 140 compares an estimated pattern of each storage node to a malignant pattern of each storage node, and set the safe group and the unsafe group based on a result of the comparison.

After the group setting unit 140 has completed the group setting, the distributed storage 102 transfers the received request to the safe group in 503. For example, the request transfer unit 160 transfers the received request to storage nodes belonging to the safe group.

According to another aspect, after data has been stored in the storage nodes of the safe group according to the transferred request, the monitoring unit 120 updates the request pattern of each storage node, and the group setting unit 140 compares the updated request pattern with the malignant pattern for each storage node, and redefines the safe group and the unsafe group based on a result of the comparison if necessary.

Therefore, according to the examples described above, since a received request is transferred to one or more storage nodes selected based on state or tendency information of data read/write requests that each storage node has received from a specific time point in the past to a current time point according to the types of the data read/write requests, it is possible to enhance the performance of each storage node and reduce a latency of a read/write operation.

The portions of the storage nodes #0 through #11 of the distributed storage 101 that control the operation of the storage nodes #0 through #11, the distributed storage management apparatus 102, the monitoring unit 120, the group setting unit 140, the request transfer unit 160, and the client 103 in FIG. 1, and the first setting unit 310 and the second setting unit 320 in FIG. 3 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this disclosure has been particularly shown and described with reference to examples thereof, it will be understood by those skilled in the art that various changes in form and details may be made in these examples without departing from the spirit and scope of the invention as defined by the claims and their equivalents. It should be understood that the examples described herein should be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the disclosure, but by the claims and their equivalents, and all variations within the scope of the claims and their equivalents are to be construed as being included in the invention.

What is claimed is:

1. A distributed storage management apparatus comprising:
    a monitoring unit configured to monitor a request pattern of each storage node of a plurality of storage nodes configured to distributively store data and at least one replica of the data;
    a group setting unit configured to receive a request and classify the plurality of storage nodes into a safe group and an unsafe group based on the monitored request pattern of each storage node; and
    a request transfer unit configured to transfer the received request to the safe group,
    wherein the group setting unit comprises a model storage unit configured to store a predetermined malignant pattern defined for each storage node.

2. The distributed storage management apparatus of claim 1, wherein each storage node comprises a solid-state drive (SSD)-based storage unit.

3. The distributed storage management apparatus of claim 1, wherein the monitoring unit is further configured to create reception information about requests each storage node has received over a period of time according to types of the requests as the request pattern of each storage node.

4. The distributed storage management apparatus of claim 3, wherein the types of the requests comprise a random access request and a sequential access request.

5. The distributed storage management apparatus of claim 3, wherein the reception information comprises a size of data that has been stored in each storage node according to the types of requests and/or a number of times the types of requests have been received.

6. The distributed storage management apparatus of claim 1, wherein the malignant pattern is any pattern or any combination of patterns selected from: a pattern in which random write requests are repeated more than a threshold time and/or more than a threshold number of times;
    a pattern in which sequential write requests are repeated more than a threshold time and/or more than a threshold number of times; and
    a pattern in which a random read request comprises an idle period that is shorter than a threshold time.

7. The distributed storage management apparatus of claim 1, wherein the group setting unit further comprises a first setting unit configured to:
    receive the request;
    create an estimated pattern for each storage node by changing the monitored request pattern of the storage node to a changed request pattern that assumes the received request has been transferred to the storage node;
    compare the estimated pattern with the malignant pattern for each storage node; and
    classify the plurality of storage nodes into the safe group and the unsafe group according to a result of the comparing.

8. The distributed storage management apparatus of claim 7, wherein the first setting unit is further configured to:
classify each storage node for which the estimated pattern is substantially identical to the malignant pattern into the unsafe group; and
classify each storage node for which the estimated pattern is not substantially identical to the malignant pattern into the safe group.

9. The distributed storage management apparatus of claim 1, wherein the group setting unit further comprises a second setting unit configured to:
compare the request pattern to the malignant pattern for each storage node at regular time intervals; and
classify the plurality of storage nodes into the safe group and the unsafe group according to a result of the comparing.

10. The distributed storage management apparatus of claim 1, wherein the request transfer unit is further configured to:
select at least two storage nodes from a plurality of storage nodes belonging to the safe group; and
transfer the received request to the selected storage nodes.

11. A distributed storage system comprising:
a distributed storage comprising a plurality of storage nodes based on a solid-state drive (SSO) configured to distributively store data and at least one replica of the data;
a monitoring unit configured to monitor a request pattern of each storage node;
a group setting unit configured to receive a request and classify the plurality of storage nodes into a safe group and an unsafe group based on the monitored request pattern of each storage node; and
a request transfer unit configured to transfer the received request to the safe group,
wherein the group setting unit comprises a model storage unit configured to store a predetermined malignant pattern defined for each storage node.

12. A distributed storage management method comprising:
monitoring a request pattern of each storage node of a plurality of storage nodes configured to distributively store data and at least one replica of the data;
receiving a request and classifying the plurality of storage nodes into a safe group and an unsafe group based on the monitored request pattern of each storage node; and
transferring the received request to the safe group,
wherein the method further comprises storing a predetermined malignant pattern defined for each storage node.

13. A distributed storage management apparatus for managing access to a plurality of storage nodes configured to distributively store original data and at least one replica of the original data, the distributed storage management apparatus comprising:
a monitoring unit configured to create a request pattern for each storage node of the plurality of storage nodes based on access requests that have been transferred to each storage node in the past;
a group setting unit configured to receive a new access request and classify the plurality of storage nodes into a safe group and an unsafe group based on the new access request and the request pattern for each storage node; and
a request transfer unit configured to transfer the new access request to the safe group,
wherein the group setting unit comprises a model storage unit configured to store a malignant pattern for each storage node.

14. The distributed storage management apparatus of claim 13, wherein the monitoring unit is further configured to create the request pattern for each storage node for a plurality of time intervals in the past.

15. The distributed storage management apparatus of claim 13, wherein each request pattern comprises information about each of a plurality of types of access requests that have been transferred to each storage node in the past.

16. The distributed storage management apparatus of claim 13, wherein the group setting unit further comprises a setting unit configured to:
receive the new access request;
create an estimated pattern for each storage node by changing the request pattern for the storage node to reflect an effect of the new access request being transferred to the storage node;
compare the estimated pattern for each storage node with the malignant pattern for the storage node, the malignant pattern being a request pattern that degrades a performance of the storage node; and
classify the plurality of storage nodes into the safe group and the unsafe group based on a result of the comparing.

17. The distributed storage management apparatus of claim 13, wherein the group setting unit further comprises a setting unit configured to:
compare the request pattern for each storage node with a malignant pattern for the storage node, the malignant pattern being a request pattern that degrades a performance of the storage node; and
classify the plurality of storage nodes into the safe group and the unsafe group based on a result of the comparing.

18. The distributed storage management apparatus of claim 13, wherein the request transfer unit is further configured to:
select a plurality of storage nodes from the safe group; and
transfer the new access request to the selected storage nodes.

19. The distributed storage management apparatus of claim 13, wherein the plurality of storage nodes are further configured to distributively store the original data and N replicas of the original data, N being an integer greater than or equal to 1; and the request transfer unit is further configured to:
select N+1 storage nodes from the safe group; and
transfer the new access request to the selected N+1 storage nodes.

* * * * *